United States Patent
Ohno et al.

(10) Patent No.: US 7,988,922 B2
(45) Date of Patent: Aug. 2, 2011

(54) HONEYCOMB FILTER AND EXHAUST GAS PURIFYING APPARATUS

(75) Inventors: Kazushige Ohno, Ibi-gun (JP); Akihiro Ohira, Ibi-gun (JP); Masafumi Kunieda, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 642 days.

(21) Appl. No.: 12/058,112

(22) Filed: Mar. 28, 2008

(65) Prior Publication Data

US 2008/0260599 A1    Oct. 23, 2008

(30) Foreign Application Priority Data

Apr. 20, 2007 (JP) .................. 2007/058647

(51) Int. Cl.
B01D 50/00 (2006.01)
(52) U.S. Cl. .................. 422/180; 422/177
(58) Field of Classification Search .................. 422/168, 422/177, 180; 55/523
See application file for complete search history.

(56) References Cited

U.S. PATENT DOCUMENTS

| | | | | |
|---|---|---|---|---|
| 5,098,455 A * | 3/1992 | Doty et al. | ................ | 55/523 |
| 5,664,049 A | 9/1997 | Kondo et al. | | |
| 5,914,187 A * | 6/1999 | Naruse et al. | ................ | 428/327 |
| 6,484,397 B1 * | 11/2002 | Collins et al. | ................ | 29/890 |
| 6,669,751 B1 | 12/2003 | Ohno et al. | | |
| 6,939,825 B1 | 9/2005 | Ohno et al. | | |
| 7,112,233 B2 | 9/2006 | Ohno et al. | | |
| 7,119,046 B2 | 10/2006 | Ohno et al. | | |
| 7,196,037 B2 | 3/2007 | Ohno et al. | | |
| 7,250,385 B1 | 7/2007 | Ohno et al. | | |
| 7,309,370 B2 | 12/2007 | Kudo et al. | | |
| 2001/0026838 A1 * | 10/2001 | Dettling et al. | ................ | 427/230 |
| 2004/0033175 A1 | 2/2004 | Ohno et al. | | |
| 2004/0161596 A1 | 8/2004 | Taoka et al. | | |
| 2005/0102987 A1 | 5/2005 | Kudo | | |
| 2005/0109023 A1 | 5/2005 | Kudo et al. | | |
| 2005/0153099 A1 | 7/2005 | Yamada | | |
| 2005/0160710 A1 | 7/2005 | Taoka et al. | | |
| 2005/0161849 A1 | 7/2005 | Ohno et al. | | |
| 2005/0169818 A1 | 8/2005 | Ohno et al. | | |
| 2005/0169819 A1 | 8/2005 | Shibata | | |
| 2005/0175514 A1 | 8/2005 | Ohno | | |
| 2005/0178098 A1 | 8/2005 | Ono et al. | | |
| 2005/0180898 A1 | 8/2005 | Yamada | | |

(Continued)

FOREIGN PATENT DOCUMENTS

EP    1604719    12/2005

(Continued)

*Primary Examiner* — Tom Duong
(74) *Attorney, Agent, or Firm* — Ditthavong Mori & Steiner, P.C.

(57) ABSTRACT

A honeycomb filter includes a honeycomb fired body having cells longitudinally disposed either end of each cell being sealed. The honeycomb filter includes an outlet-side catalyst supporting area, an inlet-side catalyst supporting area, and a catalyst unsupporting area formed between the catalyst supporting areas. A thermal conductivity of the catalyst unsupporting area is larger than those of the catalyst supporting areas. Y (%), Z (%), and X (%) satisfy the following inequalities, about $1 \leq Y \leq$ about 19, $(880-70Y)/9 \leq Z \leq (825-15Y)/9$ (about $1 \leq Y \leq$ about 10), $(330-15Y)/9 \leq Z \leq (1375-70Y)/9$ (about $10 \leq Y \leq$ about 19), and $X=100-Y-Z$ in which Y, Z, X indicate a ratio of a length of the outlet-side catalyst supporting area, the inlet-side catalyst supporting area, the catalyst unsupporting area, respectively, to an entire length of the honeycomb filter.

24 Claims, 6 Drawing Sheets

U.S. PATENT DOCUMENTS

| | | |
|---|---|---|
| 2005/0229565 A1 | 10/2005 | Yoshida |
| 2005/0247038 A1 | 11/2005 | Takahashi |
| 2005/0266991 A1 | 12/2005 | Ohno et al. |
| 2005/0272602 A1 | 12/2005 | Ninomiya |
| 2006/0021310 A1 | 2/2006 | Ohno et al. |
| 2006/0051556 A1 | 3/2006 | Ohno et al. |
| 2006/0166820 A1 | 7/2006 | Ogyu et al. |
| 2006/0188415 A1 | 8/2006 | Ohno et al. |
| 2006/0194018 A1 | 8/2006 | Ohno et al. |
| 2006/0210765 A1 | 9/2006 | Ohno et al. |
| 2006/0213163 A1 | 9/2006 | Taoka et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0228521 A1 | 10/2006 | Ohno et al. |
| 2006/0230732 A1 | 10/2006 | Kunieda |
| 2006/0254231 A1 | 11/2006 | Hayashi et al. |
| 2007/0020155 A1 | 1/2007 | Ohno et al. |
| 2007/0028575 A1 | 2/2007 | Ohno et al. |
| 2007/0044444 A1 | 3/2007 | Oshimi |
| 2007/0065348 A1 | 3/2007 | Ohno et al. |
| 2007/0068128 A1 | 3/2007 | Oshimi et al. |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0169453 A1 | 7/2007 | Hayakawa |
| 2007/0178275 A1 | 8/2007 | Takahashi |
| 2007/0190289 A1 | 8/2007 | Fujita |
| 2007/0190350 A1 | 8/2007 | Ohno et al. |
| 2007/0196620 A1 | 8/2007 | Ohno et al. |
| 2007/0204580 A1 | 9/2007 | Kunieda |
| 2007/0212517 A1 | 9/2007 | Ohno et al. |
| 2007/0293392 A1 | 12/2007 | Ohno et al. |
| 2008/0017572 A1 | 1/2008 | Kudo |
| 2008/0083202 A1 | 4/2008 | Kunieda et al. |
| 2008/0241009 A1 | 10/2008 | Ohno et al. |
| 2008/0241010 A1 | 10/2008 | Ohno et al. |
| 2008/0241011 A1 | 10/2008 | Ohno et al. |
| 2008/0241012 A1 | 10/2008 | Ohno et al. |
| 2008/0241013 A1 | 10/2008 | Ohno et al. |
| 2008/0247918 A1 | 10/2008 | Ohno et al. |
| 2008/0260599 A1 | 10/2008 | Ohno et al. |

FOREIGN PATENT DOCUMENTS

| | | |
|---|---|---|
| JP | 2001-503497 | 3/2001 |
| JP | 2002-512880 | 5/2002 |
| JP | 2003-154223 | 5/2003 |
| JP | 2003-161138 | 6/2003 |
| WO | WO98/020238 | 5/1998 |
| WO | WO99/55459 | 11/1999 |

* cited by examiner

HONEYCOMB FILTER AND EXHAUST GAS PURIFYING APPARATUS

CROSS-REFERENCE TO RELATED APPLICATIONS

The present application claims priority under 35 U.S.C. §119 to PCT Application No. PCT/JP2007/058647, filed on Apr. 20, 2007, the contents of which are incorporated herein by reference in their entirety.

BACKGROUND OF THE INVENTION

1. Field of the Invention

The present invention relates to a honeycomb filter and an exhaust gas purifying apparatus.

2. Discussion of the Background

In recent years, particulate matter (hereinafter, also referred to as "PM") such as soot contained in exhaust gases discharged from internal combustion engines of vehicles such as buses and trucks, and construction machines has raised serious problems as contaminants harmful to the environment and the human body. For this reason, various honeycomb filters, which use a honeycomb structured body made of a porous ceramic, have been proposed as filters that capture PM in exhaust gases and purify the exhaust gases.

In a honeycomb filter of this kind, a catalyst used for converting exhaust gases and/or lowering the burning temperature of PM may be supported thereon, and in this case, a catalyst supporting layer is formed in an area on which the catalyst is to be supported, so that the catalyst is supported on the catalyst supporting layer.

JP-A 2003-154223 has disclosed: a honeycomb filter made of silicon carbide, in which more catalyst is supported on the side that allows exhaust gases to flow in (gas inlet side) and less catalyst is supported on the side that allows exhaust gases to flow out (gas outlet side), or a catalyst is supported only on the gas inlet side and no catalyst is supported on the gas outlet side; and an exhaust gas converting (purifying) system in which a honeycomb filter of this kind is placed in an exhaust gas passage.

Moreover, JP-A 2003-161138 has disclosed a honeycomb filter that is designed to make the supporting amount of the catalyst successively smaller step by step or continuously, from the gas inlet side toward the gas outlet side of the honeycomb filter.

The contents of JP-A 2003-154223 and JP-A 2003-161138 are incorporated herein by reference in their entirety.

SUMMARY OF THE INVENTION

A honeycomb filter of the present invention includes a pillar-shaped honeycomb fired body having a large number of cells longitudinally disposed in parallel with one another with a cell wall therebetween, with either one end of each of the cells sealed. The honeycomb filter is configured to allow gases to flow in through either one end face side to flow out from the other end face side. The honeycomb filter further includes an outlet-side catalyst supporting area with a catalyst supporting layer formed from an end face on a gas outlet side of the honeycomb filter toward an end face on a gas inlet side of the honeycomb filter, the catalyst supporting layer having a catalyst supported thereon; an inlet-side catalyst supporting area with a catalyst supporting layer formed from an end face on the gas inlet side of the honeycomb filter toward an end face on the gas outlet side of the honeycomb filter, the catalyst supporting layer having a catalyst supported thereon; and a catalyst unsupporting area with substantially no catalyst supporting layer formed between the outlet-side catalyst supporting area and the inlet-side catalyst supporting area, the catalyst unsupporting area having substantially no catalyst supported thereon. A thermal conductivity of the catalyst unsupporting area is larger than thermal conductivities of the outlet-side catalyst supporting area and the inlet-side catalyst supporting area where Y (%), Z (%), and X (%) satisfy the following inequalities (1) to (4):

$$\text{about } 1 \leq Y \leq \text{about } 19 \quad (1)$$

$$(880-70Y)/9 \leq Z \leq (825-15Y)/9 \,(\text{about } 1 \leq Y \leq \text{about } 10) \quad (2)$$

$$(330-15Y)/9 \leq Z \leq (1375-70Y)/9 \,(\text{about } 10 \leq Y \leq \text{about } 19) \quad (3)$$

$$X = 100 - Y - Z \quad (4),$$

in which Y (%) indicates a ratio of a length of the outlet-side catalyst supporting area in a longitudinal direction of the honeycomb filter to an entire length of the honeycomb filter in the longitudinal direction of the honeycomb filter, Z (%) indicates a ratio of a length of the inlet-side catalyst supporting area in the longitudinal direction of the honeycomb filter to the entire length of the honeycomb filter in the longitudinal direction of the honeycomb filter, and X (%) indicates a ratio of a length of the catalyst unsupporting area in the longitudinal direction of the honeycomb filter to the entire length of the honeycomb filter in the longitudinal direction of the honeycomb filter.

An exhaust gas purifying apparatus according to the present invention includes a honeycomb filter; a casing covering an outside of the honeycomb filter; and a holding sealing material interposed between the honeycomb filter and the casing. The honeycomb filter includes a pillar-shaped honeycomb fired body having a large number of cells longitudinally disposed in parallel with one another with a cell wall therebetween, with either one end of each of the cells sealed. The honeycomb filter is configured to allow gases to flow in through either one end face side to flow out from the other end face side. The honeycomb filter further includes an outlet-side catalyst supporting area with a catalyst supporting layer formed from an end face on a gas outlet side of the honeycomb filter toward an end face on a gas inlet side of the honeycomb filter, the catalyst supporting layer having a catalyst supported thereon; an inlet-side catalyst supporting area with a catalyst supporting layer formed from an end face on the gas inlet side of the honeycomb filter toward an end face on the gas outlet side of the honeycomb filter, the catalyst supporting layer having a catalyst supported thereon; and a catalyst unsupporting area with substantially no catalyst supporting layer formed between the outlet-side catalyst supporting area and the inlet-side catalyst supporting area, the catalyst unsupporting area having substantially no catalyst supported thereon. A thermal conductivity of the catalyst unsupporting area is larger than thermal conductivities of the outlet-side catalyst supporting area and the inlet-side catalyst supporting area, where Y (%), Z (%), and X (%) satisfy the following inequalities (1) to (4):

$$\text{about } 1 \leq Y \leq \text{about } 19 \quad (1)$$

$$(880-70Y)/9 \leq Z \leq (825-15Y)/9 \,(\text{about } 1 \leq Y \leq \text{about } 10) \quad (2)$$

$$(330-15Y)/9 \leq Z \leq (1375-70Y)/9 \,(\text{about } 10 \leq Y \leq \text{about } 19) \quad (3)$$

$$X = 100 - Y - Z \quad (4),$$

in which Y (%) indicates a ratio of a length of the outlet-side catalyst supporting area in a longitudinal direction of the honeycomb filter to an entire length of the honeycomb filter in the longitudinal direction of the honeycomb filter, Z (%) indicates a ratio of a length of the inlet-side catalyst supporting area in the longitudinal direction of the honeycomb filter to the entire length of the honeycomb filter in the longitudinal direction of the honeycomb filter, and X (%) indicates a ratio of a length of the catalyst unsupporting area in the longitudinal direction of the honeycomb filter to the entire length of the honeycomb filter in the longitudinal direction of the honeycomb filter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1A:
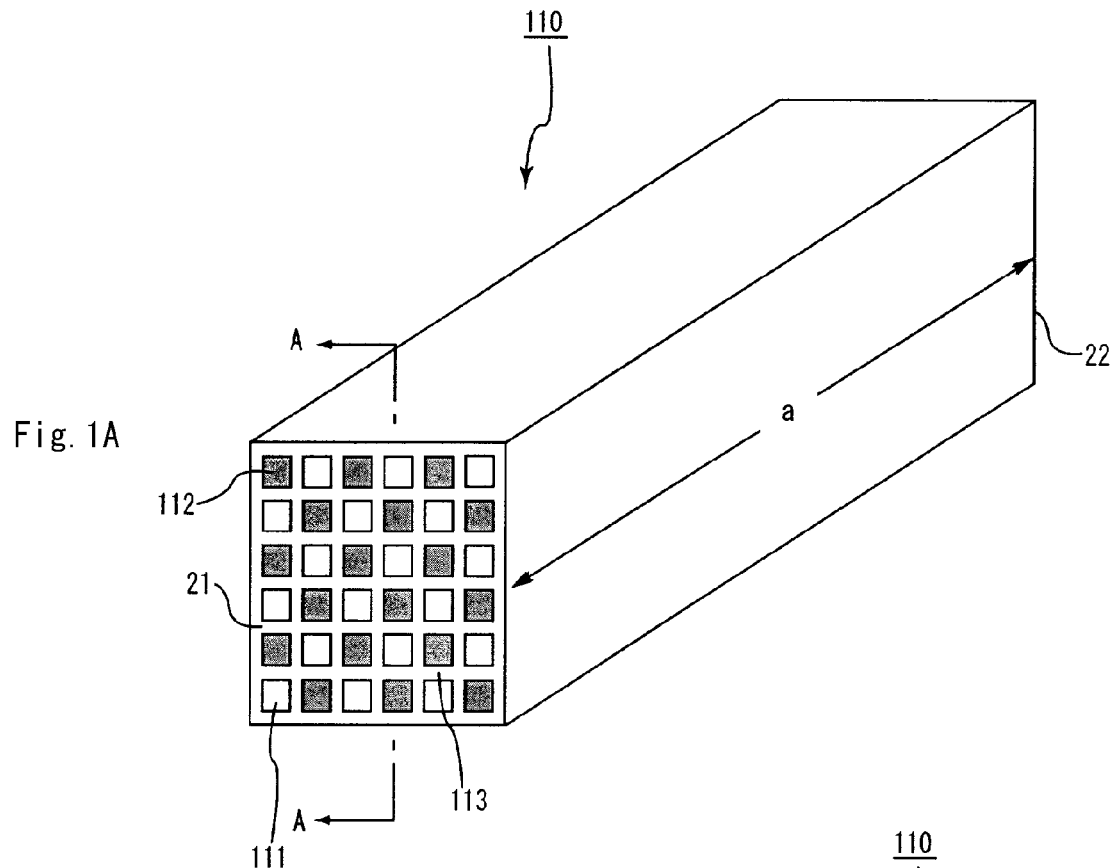
FIG. 1A is a perspective view schematically showing one example of an embodiment of the honeycomb fired body forming the honeycomb filter of the present invention.

The embodiments will now be described with reference to the accompanying drawings, wherein like reference numerals designate corresponding or identical elements throughout the various drawings.

The honeycomb filters disclosed in JP-A 2003-154223 and JP-A 2003-161138 have been created by paying attention to the finding that, since the temperature in the honeycomb filter on the gas outlet side normally tends to become higher than the temperature on the gas inlet side upon passage of high temperature exhaust gases, PM is sufficiently burned even when the amount of catalyst supported on the gas outlet side of the honeycomb filter is small.

In the honeycomb filters disclosed in JP-A 2003-154223 and JP-A 2003-161138, it is possible to reduce the amount of catalyst to be supported on the gas outlet side, and consequently to cut production costs.

Moreover, by reducing the amount of catalyst to be supported, the initial pressure loss may be lowered more easily.

Normally, a catalyst supported on a honeycomb filter performs functions of converting a toxic component in exhaust gases and assisting burning of PM. In addition, the catalyst is required to convert CO generated by incomplete combustion during a regenerating process for regenerating the honeycomb filter by burning and removing PM captured by the honeycomb filter.

Here, CO generated during the regenerating process is to flow along a flow of exhaust gases toward an end face on an outlet side. In a conventional honeycomb filter, there is a problem that, since less catalyst or no catalyst is supported on an area on the gas outlet side, the generated CO may flow out from the end face on the outlet side without being converted.

The following was found: by further providing a conventional honeycomb filter which has an area (hereinafter, referred to as inlet-side catalyst supporting area) with a catalyst supporting layer having a catalyst supported thereon formed in a predetermined area from the end face on the gas inlet side, with an area (hereinafter, referred to as outlet-side catalyst supporting area) with a catalyst supporting layer having a catalyst supported thereon formed from the end face on a gas outlet side toward the end face on a gas inlet side, CO generated during the regenerating process may be converted more easily by the catalyst supported on the outlet-side catalyst supporting area.

However, even the outlet-side catalyst supporting area is provided, when the length thereof is short, CO may fail to be converted sufficiently. Further, even in a case where the length of the outlet-side catalyst supporting area is elongated to some extent, when a length of the inlet-side catalyst supporting area is short, exhaust gases may fail to be converted sufficiently.

Furthermore, in the honeycomb filter according to an embodiment of the present invention, an area (hereinafter, referred to as catalyst unsupporting area) with no catalyst supporting layer formed therein and no catalyst supported thereon are provided between the inlet-side catalyst supporting area and the outlet-side catalyst supporting area. However, during the regenerating process, a crack may occur in the honeycomb filter depending on a location of the catalyst unsupporting area. Especially, a crack tends to occur easily in a case where the length of the outlet-side catalyst supporting area is long and the length of the inlet-side catalyst supporting area is short. Since a honeycomb filter with a crack of this kind cannot be used as a honeycomb filter, it is required to prevent an occurrence of a crack during the regenerating process.

A cause of the occurrence of a crack of this kind was researched, and it was estimated that the crack occurs for the following reasons.

Heat generated during the regenerating process flows from the end face on the gas inlet side toward the end face on the gas outlet side along the direction of a flow of exhaust gases. Therefore, presumably, a temperature of the honeycomb filter tends to be higher gradually from the end face on the gas inlet side toward the end face on the gas outlet side, and the temperature on the end face on the gas outlet side may be the highest.

However, in reality, heat is released from the end face on the gas outlet side to an outside of the honeycomb filter. Therefore, an area with the highest temperature is not the end face on the gas outlet side, but an area slightly moved from the end face on the gas outlet side in a direction to the end face on the gas inlet side.

Here, in an area with a high temperature during the regenerating process, a great thermal stress is generated so as to easily cause a crack in the honeycomb filter.

Moreover, since the catalyst supporting layer is formed by an alumina or the like, which has a low thermal conductivity, the area with the catalyst supporting layer formed therein has a thermal conductivity lower than that of the area with no catalyst supporting layer formed therein, and in the area having a lower thermal conductivity, the heat generated during the regenerating process tend to be kept inside.

Accordingly, the area with the catalyst supporting layer formed therein tends to have a high temperature during the regenerating process and vulnerable to a great thermal stress.

As a result, presumably, when the catalyst supporting layer is formed in the above-described area slightly moved from the end face on the gas outlet side in the direction to the end face on the gas inlet side, a crack tends to be caused by the thermal stress.

Based on the above result, a method for forming a catalyst supporting area more easily capable of converting exhaust gases and preventing an occurrence of a crack during the regenerating process was studied.

Consequently, it was found that, when a ratio of the length of the outlet-side catalyst supporting area, the length of the inlet-side catalyst supporting area and the length of the catalyst unsupporting area with respect to an entire length of the honeycomb filter in the longitudinal direction satisfies a predetermined relationship, a honeycomb filter is more easily capable of converting exhaust gases and preventing an occurrence of a crack during the regenerating process.

Namely, a honeycomb filter described in the embodiments of the present invention is a honeycomb filter including a pillar-shaped honeycomb fired body having a large number of cells longitudinally disposed in parallel with one another with a cell wall therebetween, with either one end of each of the cells sealed, the honeycomb filter allowing gases having flowed in through either one end face side to flow out from the other end face side, the honeycomb filter including:

an outlet-side catalyst supporting area with a catalyst supporting layer formed from an end face on a gas outlet side of the honeycomb filter toward an end face on a gas inlet side of the honeycomb filter, the catalyst supporting layer having a catalyst supported thereon;

an inlet-side catalyst supporting area with a catalyst supporting layer formed from an end face on the gas inlet side of the honeycomb filter toward an end face on the gas outlet side of the honeycomb filter, the catalyst supporting layer having a catalyst supported thereon; and a catalyst unsupporting area with no catalyst supporting layer formed between the outlet-side catalyst supporting area and the inlet-side catalyst supporting area, the catalyst unsupporting area having no catalyst supported thereon, wherein a thermal conductivity of the catalyst unsupporting area is larger than thermal conductivities of the outlet-side catalyst supporting area and the inlet-side catalyst supporting area, and wherein Y (%), Z (%), and X (%) satisfy the following inequalities (1) to (4):

$$\text{about } 1 \leq Y \leq \text{about } 19 \quad (1)$$

$$(880-70Y)/9 \leq Z \leq (825-15Y)/9 \,(\text{about } 1 \leq Y \leq \text{about } 10) \quad (2)$$

$$(330-15Y)/9 \leq Z \leq (1375-70Y)/9 \,(\text{about } 10 \leq Y \leq \text{about } 19) \quad (3)$$

$$X=100-Y-Z \quad (4),$$

Y (%) indicating a ratio of a length of the outlet-side catalyst supporting area in a longitudinal direction of the honeycomb filter to an entire length of the honeycomb filter in the longitudinal direction, Z (%) indicating a ratio of a length of the inlet-side catalyst supporting area in the longitudinal direction of the honeycomb filter to the entire length of the honeycomb filter in the longitudinal direction, and X (%) indicating a ratio of a length of the catalyst unsupporting area in the longitudinal direction of the honeycomb filter to the entire length of the honeycomb filter in the longitudinal direction.

Figure 1B:
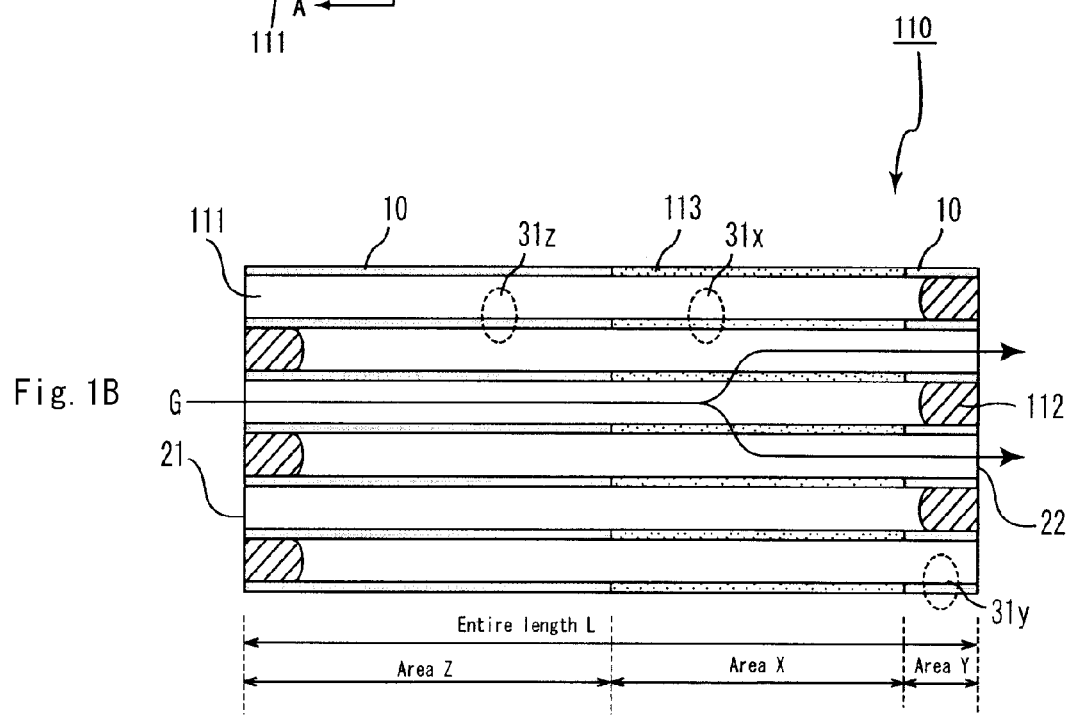
FIG. 1B is an A-A line cross sectional view of FIG. 1A.

FIG. 1A is a perspective view schematically showing one example of an embodiment of a honeycomb fired body forming the honeycomb filter of the present invention, and FIG. 1B is an A-A line cross-sectional view of FIG. 1A.

In a honeycomb fired body 110 shown in FIGS. 1A and 1B, a large number of cells 111 are longitudinally disposed in parallel with one another (in a direction shown by an arrow a in FIG. 1A) with a cell wall 113 therebetween, and either one end of each of the cells 111 is sealed with a plug 112. Therefore, exhaust gases G having flowed into the cells 111 each having an opening on an end face 21 on the gas inlet side surely pass through the cell wall 113 that separates the cells 111, and flow out from other cells 111 each having an opening on an end face 22 on the gas outlet side.

In the honeycomb fired body 110, a gas inlet-side catalyst supporting area (area Z) with a catalyst supporting layer 10 formed on the cell wall 113 in a predetermined area from the end face 21 on the gas inlet side in a longitudinal direction of the honeycomb fired body 110, the catalyst supporting layer 10 having a catalyst supported thereon, is provided. Moreover, a gas outlet-side catalyst supporting area (area Y) with the catalyst supporting layer 10 formed on the cell wall 113 in a predetermined area from the end face 22 on the gas outlet side in the longitudinal direction of the honeycomb fired body 110, the catalyst supporting layer 10 having a catalyst supported thereon, is provided.

Further, between the area Z and the area Y, a catalyst unsupporting area (area X) having no catalyst supporting layer formed therein and no catalyst supported thereon is provided.

Here, a ratio (%) of each of the length of the outlet-side catalyst supporting area (area Y), the length of the inlet-side catalyst supporting area (area Z) and the length of the catalyst unsupporting area (area X) with respect to an entire length of the honeycomb fired body in the longitudinal direction is defined as a ratio (%) of each of the areas.

Further, in the present description, a ratio (%) of each of the length of the outlet-side catalyst supporting area, the length of the inlet-side catalyst supporting area and the length of the catalyst unsupporting area with respect to the entire length of the honeycomb filter in the longitudinal direction is respectively defined as a ratio of area Y, a ratio of area Z and a ratio of area X.

Furthermore, the entire length of the honeycomb filter is the same as the entire length of the honeycomb fired body.

In the honeycomb filter described in the embodiments of the present invention, as shown in the inequality (1), the ratio of the outlet-side catalyst supporting area Y satisfies about $1 \leq Y \leq$ about 19.

In a case where the ratio of the area Y is about 1% or more, since the outlet-side catalyst supporting area for converting CO on the gas outlet side is not too short, CO is more likely to be converted sufficiently regardless of the ratio of the area Z and the ratio of the area X. Further, in a case where the ratio of the area Y is about 19% or more, a great thermal stress tends not to be applied on the outlet-side catalyst supporting area during the regenerating process and a crack is less likely to be caused in the honeycomb filter regardless of the ratio of the area Z and the ratio of the area X.

In the honeycomb filter described in the embodiments of the present invention, as shown in the inequalities (2) and (3), a value of the ratio of the area Z is set so as to be within the range of a minimum value to a maximum value defined by a function of the ratio of the area Y. Here, the function is changed according to the value of the ratio of the area Y.

Further, when the ratio of the area Y and the ratio of the area Z are set, the ratio of the area X can be set using the inequality (4).

In the honeycomb filter described in the embodiments of the present invention, a value Y of the ratio of the area Y and a value Z of the ratio of the area Z satisfy the following inequalities (2a) and (3a).

Here, the inequalities (2a) and (3a) are respectively part of the inequalities (2) and (3).

$$(880-70Y)/9 \leq Z \text{(about } 1 \leq Y \leq \text{about } 10) \quad (2a)$$

$$(330-15Y)/9 \leq Z \text{(about } 10 \leq Y \leq \text{about } 19) \quad (3a)$$

When the ratio of the area Z is set as mentioned above, exhaust gases tend to be sufficiently converted by the catalyst supported on the inlet-side catalyst supporting area and on the outlet-side catalyst supporting area.

Further, in the honeycomb filter described in the embodiments of the present invention, the value Y of the ratio of the area Y and the value Z of the ratio of the area Z satisfy the following inequalities (2b) and (3b).

Here, the inequalities (2b) and (3b) are respectively part of the inequalities (2) and (3).

$$Z \leq (825-15Y)/9 \text{(about } 1 \leq Y \leq \text{about } 10) \quad (2b)$$

$$Z \leq (1375-70Y)/9 \text{(about } 10 \leq Y \leq \text{about } 19) \quad (3b)$$

When the ratio of the area Z and the thermal conductivity of each of the areas are set as mentioned above, the ratio of the catalyst unsupporting area X having high thermal conductivity becomes sufficiently high, so that a temperature rise in the honeycomb filter caused by heat kept in the honeycomb filter during the regenerating process may be prevented more easily. Accordingly, it may be easier to obtain a honeycomb filter in which a crack is hard to be caused during the regenerating process.

As described above, in the honeycomb filter described in the embodiments of the present invention, each of the ratio of the outlet-side catalyst supporting area Y, the ratio of the inlet-side catalyst supporting area Z and the ratio of the catalyst unsupporting area X is maintained within a desirable range. Therefore, it may be easier to obtain a honeycomb filter described in the embodiments of the present invention, in which exhaust gases may be converted more easily and a crack hardly occurs during the regenerating process.

In the honeycomb filter described in the embodiments of the present invention, the catalyst includes platinum.

In the honeycomb filter described in the embodiments of the present invention, exhaust gases can be converted by the platinum catalyst supported on the catalyst supporting layer.

In the honeycomb filter described in the embodiments of the present invention, the catalyst is supported in an amount of at least about 0.5 g and at most about 5.0 g with respect to a volume of 1 liter of the honeycomb filter.

In the honeycomb filter described in the embodiments of the present invention, since the catalyst is supported in the amount of about 0.5 g or more with respect to a volume of 1 liter of the honeycomb filter, a toxic component in exhaust gases may be converted more easily.

Further, since a supporting amount of the catalyst is maintained about 5.0 g or less with respect to a volume of 1 liter of the honeycomb filter, the amount of the expensive catalyst usage may be saved more easily.

In the honeycomb filter described in the embodiments of the present invention, a main component of the honeycomb filter includes a silicon carbide.

Since the silicon carbide has high thermal conductivity, heat is hardly kept in the catalyst unsupporting area. Therefore it may be easier to obtain the honeycomb filter described in the embodiments of the present invention that is hardly cracked during the regenerating process.

The embodiments of the present invention have been devised to solve the above-mentioned problem, and its purpose is to provide a honeycomb filter more easily capable of converting exhaust gases and CO generated during the regenerating process.

First Embodiment

The following will discuss a first embodiment, which is one embodiment of the present invention, with reference to drawings.

Figure 2:
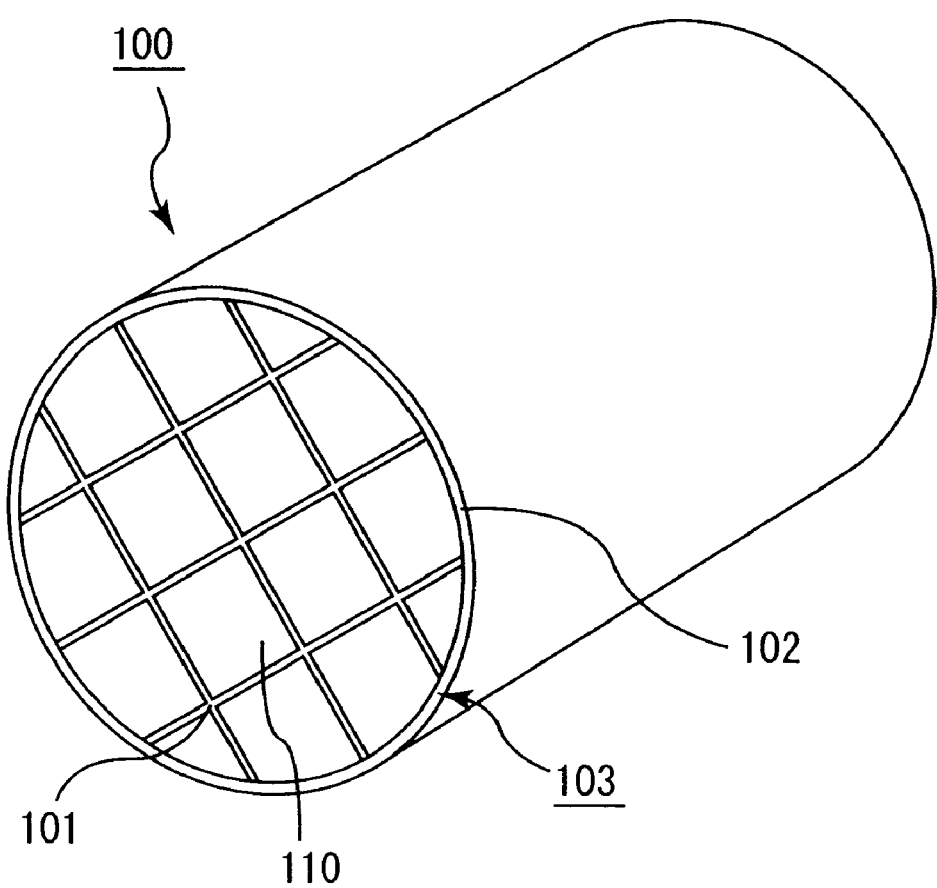
FIG. 2 is a perspective view schematically showing one example of an embodiment of a honeycomb filter of the present invention.

FIG. 2 is a perspective view schematically showing one example of an embodiment of the honeycomb filter of the present invention.

In a honeycomb filter 100, a plurality of honeycomb fired bodies 110 each having a shape as shown in FIGS. 1A and 1B are combined with one another by interposing a sealing material layer (adhesive layer) 101 to form a ceramic block 103, and a sealing material layer (coat layer) 102 is further formed on the periphery of this ceramic block 103.

In the honeycomb filter of the present embodiment, an outlet-side catalyst supporting area, an inlet-side catalyst supporting area and a catalyst unsupporting area are provided as shown in FIG. 1B. In each of the catalyst supporting area, a catalyst supporting layer including γ-alumina and the like is formed and on the catalyst supporting layer, a platinum (Pt) catalyst is supported in the amount of at least about 0.5 g and at most about 5.0 g with respect to a volume of 1 liter of the honeycomb filter.

Here, Y (%), Z (%), and X (%) satisfy the following inequalities (1) to (4).

$$\text{about } 1 \leq Y \leq \text{about } 19 \quad (1)$$

$$(880-70Y)/9 \leq Z \leq (825-15Y)/9 \text{(about } 1 \leq Y \leq \text{about } 10). \quad (2)$$

$$(330-15Y)/9 \leq Z \leq (1375-70Y)/9 \text{(about } 10 \leq Y \leq \text{about } 19) \quad (3)$$

$$X = 100 - Y - Z \quad (4),$$

Y (%) indicating a ratio of a length of the outlet-side catalyst supporting area in a longitudinal direction of the honeycomb filter to an entire length of the honeycomb filter in the longitudinal direction, Z (%) indicating a ratio of a length of the inlet-side catalyst supporting area in the longitudinal direction of the honeycomb filter to the entire length of the honeycomb filter in the longitudinal direction, and X (%) indicating a ratio of a length of the catalyst unsupporting area in the longitudinal direction of the honeycomb filter to the entire length of the honeycomb filter in the longitudinal direction.

The following will discuss the range indicated by the inequalities (1) to (4) with reference to graphs.

Figure 3:
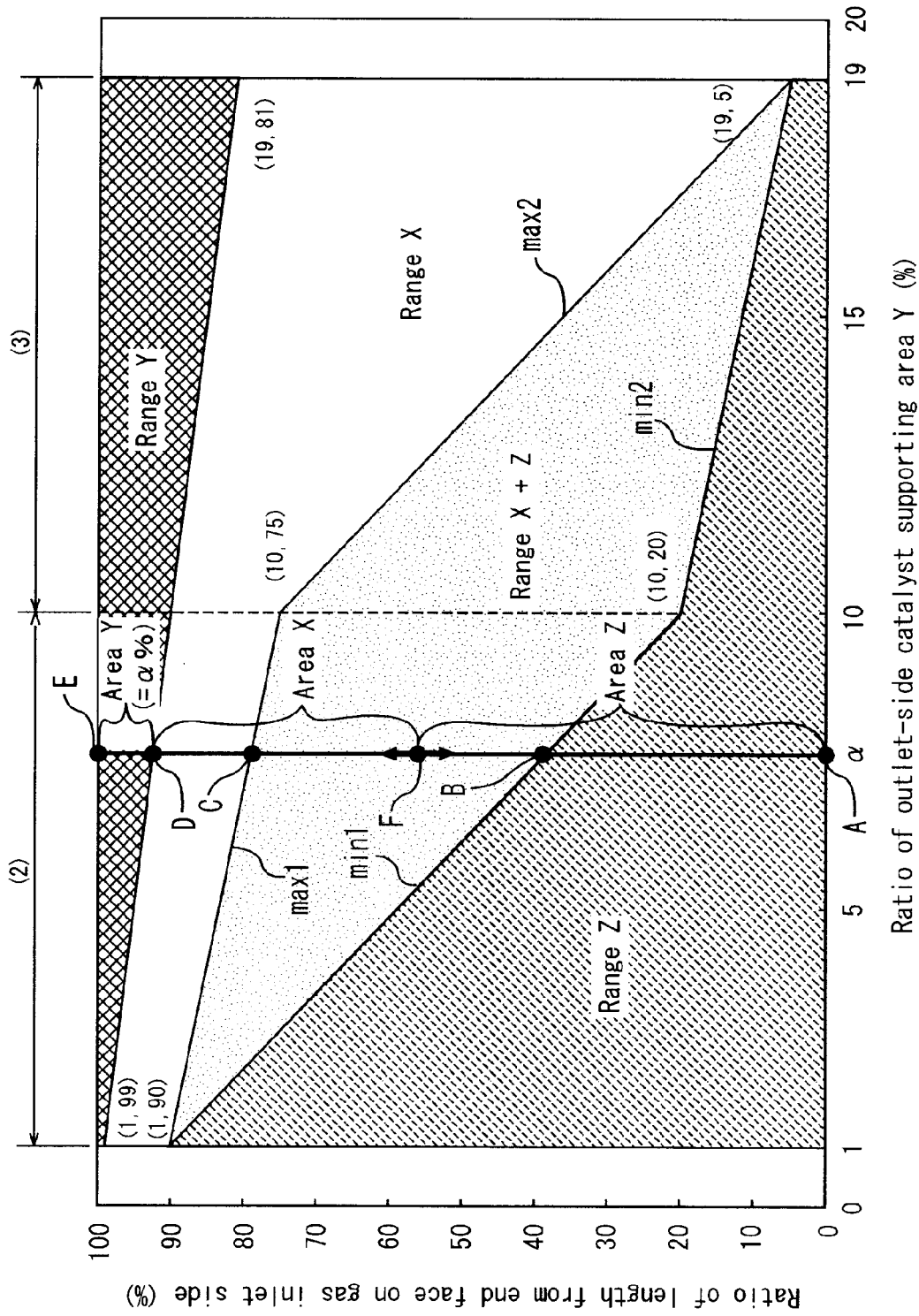
FIG. 3 is a graph showing ranges of the respective areas of the honeycomb filter according to an embodiment of the present invention when the ratio of the outlet-side catalyst supporting area Y is changed.

FIG. 3 is a graph showing ranges of the respective areas of the honeycomb filter of an embodiment of the present invention when the ratio of the outlet-side catalyst supporting area Y is changed.

Since the range of the ratio of the area Y is defined to be (about 1≦Y≦about 19) in the inequality (1), the desirable ranges of the respective areas within the range (about 1≦Y≦about 19) are shown in FIG. 3. Further, arrows (2) and (3) shown in an upper part of FIG. 3 indicate the ranges of the ratio of the area Y in which each of the inequalities (2) and (3) is applicable.

First, the following will discuss the respective ranges shown in the FIG. 3.

A ratio of a length from an end face on a gas inlet side, when the end face on the gas inlet side and an end face on the gas outlet side are respectively defined as 0% and 100%, is plotted on a vertical axis in FIG. 3. A ratio of the outlet-side catalyst supporting area Y is plotted on a horizontal axis in FIG. 3.

Namely, FIG. 3 shows which area, out of the area Y, the area Z and the area X, includes a point on the vertical axis located at a ratio of a certain length from the end face on the gas inlet-side, when the ratio of the outlet-side catalyst supporting area Y in the honeycomb filter of the embodiments of the present invention is a certain value.

For example, when a certain value (for example, a) of the ratio of the outlet-side catalyst supporting area Y is plotted on a horizontal axis as a point A, by drawing a line parallel with the vertical axis from the point A in an upward direction of FIG. 3, it is possible to see which area is provided along the line. In FIG. 3, the inlet-side catalyst supporting area is surely provided in a range indicated by Range Z, at least one of the inlet-side catalyst supporting area and the catalyst unsupporting area is provided in a range indicated by Range (X+Z), the catalyst unsupporting area is surely provided in a range indicated by Range X, and the outlet-side catalyst supporting area is surely provided in a range indicated by Range Y.

Here, at least one of the inlet-side catalyst supporting area and the catalyst unsupporting area being provided in Range (X+Z) in FIG. 3 indicates that there is a boundary between the inlet-side catalyst supporting area and the catalyst unsupporting area within this range in the honeycomb filter according to the embodiments of the present invention. Namely, a honeycomb filter having the boundary between the inlet-side catalyst supporting area and the catalyst unsupporting area out of Range (X+Z) does not satisfy a required condition for the honeycomb filter defined in the embodiments of the present invention.

With regard to a honeycomb filter having a % of the ratio of the area Y in FIG. 3, the ratio of each of the areas is defined as follows.

First, in FIG. 3, a line is drawn from a point (point A in the figure) of 0% of the vertical axis to a point (point E in the figure) of 100% of the vertical axis. Here, an intersection with the boundary line between Range Z and Range (X+Z) in the figure is defined as a point B. An intersection with the boundary line between Range (X+Z) and Range X in the figure is defined as a point C. An intersection with the boundary line between Range X and Range Y in the figure is defined as a point D.

Then, a range (point A-point B) is surely included in the inlet-side catalyst supporting area.

Further, at a certain point within a range (point B-point C), there is a boundary between the inlet-side catalyst supporting area and the catalyst unsupporting area. A range (point C-point D) is surely included in the catalyst unsupporting area, and a range (point D-point E) is surely included in the outlet-side catalyst supporting area.

Supposing there is the boundary between the inlet-side catalyst supporting area and the catalyst unsupporting area at a point F, the ratio of the inlet-side catalyst supporting area Z is indicated by a length of a range (point A-point F), the ratio of the catalyst unsupporting area X is indicated by a length of a range (point F-point D), and the ratio of the outlet-side catalyst supporting area Y is indicated by a length of the range (point D-point E).

When the ratio of the area Y is a %, the point F, which is the boundary between the inlet-side catalyst supporting area and the catalyst unsupporting area, can be an optional point between the point B and the point C. Here, when the point F is located at the position of point C, the ratio of the inlet-side catalyst supporting area Z corresponds to the ratio indicated by a length of a range (point A-point C), which is a maximum value. Further, when the point F is located at the position of point B, the ratio of the inlet-side catalyst supporting area Z corresponds to the ratio indicated by the length of the range (point A-point B), which is a minimum value.

Even when the ratio of the area Y is changed from a to another value, the maximum value and the minimum value of the area Z are defined in the same manner. Accordingly, the boundary line between Range (X+Z) and Range X is a boundary line indicating the maximum value of the ratio of the inlet-side catalyst supporting area Z and the boundary line between Range (X+Z) and Range Z is a boundary line indicating the minimum value of the ratio of the inlet-side catalyst supporting area Z.

These boundaries have different inclinations according to the ratio of the area Y, and the boundary line between Range (X+Z) and Range X has an inflection point at a point indicated by (10, 75) in FIG. 3.

Further, the boundary line between Range (X+Z) and Range Z has the inflection point at a point indicated by (10, 20) in FIG. 3.

These boundary lines can be expressed in a function of Y to Z, when defining a value of the vertical axis as Z and a value of the horizontal axis as Y Inequalities indicating the functions are changed at the inflection points as shown in FIG. 3, according to the range of the ratio of the area Y.

The inequalities (2) and (3) respectively define the maximum value and the minimum value of the ratio of the area Z corresponding to the range of the ratio of the area Y A left side of an inequality sign indicates the boundary line (the boundary line between Range (X+Z) and Range Z) showing the minimum value of the ratio of the area Z in FIG. 3 and a right side of the inequality sign indicates the boundary line (the boundary line between Range (X+Z) and Range X) showing the maximum value of the ratio of the area Z in FIG. 3.

The minimum value of the ratio of the area Z is defined as the ratio of a minimum length of the inlet-side catalyst supporting area required for converting exhaust gases sufficiently.

In a case where the ratio of the area Y is within the range (about 1≦Y≦about 19) defined by the inequality (1), exhaust gas converting performance only in the outlet-side catalyst supporting area is inadequate to convert exhaust gases sufficiently. Accordingly, in addition to the outlet-side catalyst supporting area, the required inlet-side catalyst supporting area for converting exhaust gases sufficiently needs to be provided.

The minimum value of the ratio of the required inlet-side catalyst supporting area Z for converting exhaust gases sufficiently is different according to the relation of the inlet-side catalyst supporting area Z and the outlet-side catalyst supporting area Y. More specifically, in a case where the ratio of the area Y is high, since much of exhaust gases may be converted more easily in the outlet-side catalyst supporting area, the ratio of the required inlet-side catalyst supporting area Z for converting exhaust gases may be lowered more easily.

Consequently, the minimum value of the ratio of the area Z is decreased corresponding to the increase in the ratio of the area Y in most of the range. However, the inequality that indicates the relation between the minimum value of the ratio of the area Z and the ratio of the area Y is different according to the ratio of the area Y, and the relation thereof can be expressed in two inequalities according to the ratio of the area Y.

In either of the ranges indicated by the inequalities (2) and (3), with the ratio of the area Z less than the minimum value indicated by these inequalities, exhaust gases tend not to be converted sufficiently.

The maximum value of the ratio of the area Z is defined as the ratio of the length of the inlet-side catalyst supporting area when a minimum required catalyst unsupporting area for preventing an occurrence of a crack in the honeycomb filter during the regenerating process is provided.

First, in order to prevent the occurrence of a crack in the honeycomb filter during the regenerating process when the ratio of the area Y is within the range (about $1 \leq Y \leq$ about 19) defined by the inequality (1), the ratio of the catalyst unsupporting area X needs to be a predetermined value or more.

In the catalyst unsupporting area, the catalyst supporting layer is not formed and a thermal conductivity thereof is larger than that of the outlet-side catalyst supporting area and that of the inlet-side catalyst supporting area. Therefore, heat is less likely to be kept in the catalyst unsupporting area during the regenerating process and the temperature therein is less likely to rise.

Further, in the honeycomb filter of the present embodiment, the catalyst unsupporting area is provided adjacently to the outlet-side catalyst supporting area. This area can be regarded as an area slightly moved from the end face on the gas outlet side in a direction to the end face on the gas inlet side. In the above-described honeycomb filter, the temperature of this area tends to be raised to a high temperature during the regenerating process; however, it may be easier to prevent the temperature of this area from rising to a high temperature by making this area a catalyst unsupporting area. Accordingly, the great thermal stress is less likely to be applied on this area during the regenerating process and the occurrence of a crack in the honeycomb filter may be prevented more easily.

Further, in a case where the ratio of the area Y is as high as about 10% or more, much heat is generated in the outlet-side catalyst supporting area. Therefore, the ratio of the area X, which is the catalyst unsupporting area, needs to be increased. Accordingly, the ratio of the minimum required catalyst unsupporting area X for preventing the occurrence of a crack in the honeycomb filter is further increased.

The ratio of the inlet-side catalyst supporting area Z is obtained by subtracting the ratio of the area Y and the ratio of the area X from the ratio (100%) of the entire length of the honeycomb filter. When assuming that the ratio of the area Y is a certain value, the ratio of the area Z has a maximum value required for preventing the occurrence of a crack in the honeycomb filter.

As a result, the maximum value of the ratio of the area Z is decreased according to the increase in the ratio of the area Y. However, an inequality showing the relation between the maximum value of the ratio of the area Z and the ratio of the area Y is different according to the ratio of the area Y, and the relation thereof can be expressed in two inequalities according to the ratio of the area Y.

In either of the ranges indicated by the inequalities (2) and (3) with the ratio of the area Z exceeding the maximum value indicated by these inequalities, a crack tends to be caused in the honeycomb filter during the regenerating process.

The inequality (2) defines the desirable range of the area Z in the range (about $1 \leq Y \leq$ about 10).

Since the ratio of the area Y is comparatively low within this range, the ratio of the inlet-side catalyst supporting area Z needs to be comparatively high in order to convert exhaust gases. Here, the minimum value of the ratio of the area Z is decreased according to the increase in the ratio of the area Y, and the minimum value of the ratio of the area Z is shown by the line (Z=(880−70Y)/9) indicated as min1 in FIG. 3.

When the ratio of the area Z is less than ((880−70Y)/9), the honeycomb filter tends to be deficient in the area having a catalyst for converting exhaust gases supported thereon, and exhaust gases tend not to be converted sufficiently.

Moreover, in the range defined by the inequality (2), the ratio of the catalyst unsupporting area X needs to be determined in order to prevent a crack in the honeycomb filter during the regenerating process. A line showing the maximum value of the ratio of the area Z is shown by the line (Z=(825−15Y)/9) indicated as max1 in FIG. 3.

In a case where the ratio of the area Z exceeds ((825−15Y)/9), heat is more likely to be kept in the area slightly moved from the end face on the gas outlet side in a direction to the end face on the gas inlet side during the regenerating process, and therefore, the temperature in this area becomes too high, so that a crack may be caused in the honeycomb filter.

The inequality (3) defines the desirable ratio of the area Z in the range of about $10 \leq Y \leq$ about 19. In this range, the minimum value of the ratio of the required area Z for converting exhaust gases is shown by a line (Z=(330−15Y)/9) indicated as min2 in FIG. 3.

When the ratio of the area Z is less than ((330−15Y)/9), the length of the inlet-side catalyst supporting area is too short, and therefore, exhaust gases tend not to be converted sufficiently on the gas inlet side. As a result, the honeycomb filter is less likely to convert exhaust gases sufficiently as a whole.

Further, in order to prevent a crack in the honeycomb filter during the regenerating process, the ratio of the catalyst unsupporting area X needs to be higher than the value obtained by the inequality (2) and a rate of the increase in the ratio of the area X with respect to the increase in the ratio of the area Y needs to be further raised.

Accordingly, the line showing the maximum value of the ratio of the area Z is a line further declining according to the increase in the ratio of the area Y. This line is shown by a line (Z=(1375−70Y)/9) indicated as max2 in FIG. 3.

Further, in the present embodiment, the thermal conductivity of the catalyst unsupporting area in the honeycomb filter is set larger than the thermal conductivities of the outlet-side catalyst supporting area and the inlet-side catalyst supporting area.

Here, the thermal conductivity of the catalyst unsupporting area in the honeycomb filter is desirably set to be at least about 1.3 times and at most about 5.0 times larger than the thermal conductivities of the outlet-side catalyst supporting area and the inlet-side catalyst supporting area in the honeycomb filter.

The thermal conductivities of the respective areas can be obtained by measuring thermal conductivities of the cell walls at measuring portions $31z$, $31x$ and $31y$, respectively shown in FIG. 1B.

Hereinafter, the following description will discuss the method for manufacturing a honeycomb filter of the present embodiment.

First, mixed powder is prepared by mixing silicon carbide powder having different average particle diameters as a ceramic material and an organic binder, and concurrently, a mixed liquid is prepared by mixing a liquid plasticizer, a lubricant, and water. Then, the mixed powder and the mixed liquid are mixed by using a wet mixing machine so that a wet mixture for manufacturing a molded body is prepared.

Successively, the wet mixture is charged into an extrusion-molding machine.

A honeycomb molded body in a predetermined shape is formed by charging the wet mixture into the extrusion-molding machine and extrusion-molding the wet mixture.

The both ends of the honeycomb molded body are cut by using a cutting machine, so that a honeycomb molded body having a predetermined length is obtained. Then the cut honeycomb molded body is dried using a drying apparatus. Next, a predetermined amount of a plug material paste is filled into an end on the gas outlet side of each of cells having an opening on the end face on the gas inlet side, and into an end on the gas inlet side of each of cells having an opening on the end face on the gas outlet side, so that each of the cells is sealed.

A cell-sealed honeycomb molded body is manufactured through these processes.

Next, the cell-sealed honeycomb molded body is degreased in a degreasing furnace by heating an organic matter contained therein, and the degreased honeycomb molded body is conveyed to a firing furnace and fired therein, so that a honeycomb fired body is manufactured.

Moreover, a sealing material paste, which is to be a sealing material layer (adhesive layer), is applied to a side face of the resulting honeycomb fired body to form a sealing material paste layer thereon, and another honeycomb fired body is successively laminated with this sealing material paste layer interposed therebetween. By repeating these processes, an aggregated body of honeycomb fired bodies with a predetermined number of honeycomb fired bodies combined with one another is manufactured. Here, with respect to the sealing material paste, a material made of an inorganic binder, an organic binder, and at least one of inorganic fibers and inorganic particles may be used.

Next, this aggregated body of honeycomb fired bodies is heated, so that the sealing material paste layers are dried and solidified to form sealing material layers (adhesive layers). Thereafter, a cutting process is carried out on the aggregated body of honeycomb fired bodies by using a diamond cutter to form a ceramic block, and the sealing material paste is applied to a peripheral face of the ceramic block, then dried and solidified to form a sealing material layer (coat layer). Thus, a honeycomb filter is manufactured.

Next, a catalyst supporting layer including alumina is formed in a predetermined area of the honeycomb filter, and a platinum catalyst is supported on the catalyst supporting layer. More specifically, the following processes (a) and (b) are carried out.

(a) The honeycomb filter is immersed in an alumina solution containing alumina particles with the face to be the end face on the gas inlet side facing down, so that the predetermined area, in which the inlet-side catalyst supporting area is to be formed, is immersed in the alumina solution; thus, the alumina particles are adhered selectively to the predetermined area of the honeycomb filter.

Subsequently, the honeycomb filter is once lifted out of the alumina solution to be turned upside down, and immersed again in the alumina solution with the face to be the end face on the gas outlet side facing down, so that the predetermined area, in which the outlet-side catalyst supporting area is to be formed, is immersed in the alumina solution; thus, the alumina particles are selectively adhered to the predetermined area of the honeycomb filter.

Then, the honeycomb filter is dried at a temperature of at least about 110° C. and at most about 200° C. for about two hours, and the dried honeycomb filter is fired at a temperature of at least about 500° C. and at most about 1000° C. so that the catalyst supporting layer is formed in the predetermined area of the honeycomb filter.

(b) Next, the honeycomb filter is immersed into a solution of a metal compound containing platinum, with the face to be the end face on the gas inlet side facing down, so that the predetermined area with the catalyst supporting layers formed therein is immersed in the solution.

Subsequently, the honeycomb filter is lifted out of the solution of a metal compound to be turned upside down, and immersed again in the solution of a metal compound with the face to be the end face on the gas outlet side facing down, so that the predetermined area with the catalyst supporting layers formed therein is immersed in the solution of a metal compound.

The resulting honeycomb filter is dried, and then, fired at a temperature of at least about 500° C. and at most about 800° C. under inert atmosphere so that the catalyst is supported on the catalyst supporting layers.

In the following, effects of the honeycomb filter of the present embodiment are listed.

(1) The outlet-side catalyst supporting area having the platinum catalyst supported thereon is provided in the predetermined area (area Y) from the end face on the gas outlet side and the ratio of the area Y is about 1% or more. Therefore, CO generated during the regenerating process may be converted more easily by using the catalyst supported on the gas outlet-side catalyst supporting area.

Further, the inlet-side catalyst supporting area having the platinum catalyst supported thereon is provided in the predetermined area (area Z) from the end face on the gas inlet side and the ratio of the inlet-side catalyst supporting area Z is set to be a value determined by the following inequalities (2a) and (3a) or more. Therefore, exhaust gases tend to be converted (purified) sufficiently.

$$(880-70Y)/9 \leq Z (\text{about } 1 \leq Y \leq \text{about } 10) \tag{2a}$$

$$(330-15Y)/9 \leq Z (\text{about } 10 \leq Y \leq \text{about } 19) \tag{3a}$$

(2) Since the ratio of the outlet-side catalyst supporting area Y is about 19% or less, it may be easier to prevent the occurrence of a crack in the honeycomb filter caused by the application of the great thermal stress on the honeycomb filter during the regenerating process.

Further, the ratio of the inlet-side catalyst supporting area Z is set to be a value determined by the following inequalities (2b) and (3b) or less. Therefore, the sufficient ratio of the catalyst unsupporting area is provided.

$$Z \leq (825-15Y)/9 (\text{about } 1 \leq Y \leq \text{about } 10) \tag{2b}$$

$$Z \leq (1375-70Y)/9 (\text{about } 10 \leq Y \leq \text{about } 19) \tag{3b}$$

Furthermore, the thermal conductivity of the catalyst unsupporting area is larger than the thermal conductivities of the outlet-side catalyst supporting area and the inlet-side catalyst supporting area. Therefore, it may be easier to prevent the temperature rise caused by heat kept in the honeycomb filter during the regenerating process, and consequently, it may be easier to prevent the occurrence of a crack in the honeycomb filter.

(3) The platinum catalyst is supported in the amount of about 0.5 g or more with respect to 1 liter of volume of the honeycomb filter, and therefore, it may be easier to convert (purify) a toxic component in exhaust gases more sufficiently.

Further, the supported amount of the platinum catalyst is set to be about 5.0 g or less with respect to 1 liter of volume of the honeycomb filter, the amount of the expensive catalyst usage may be suppressed more easily.

Figure 6:
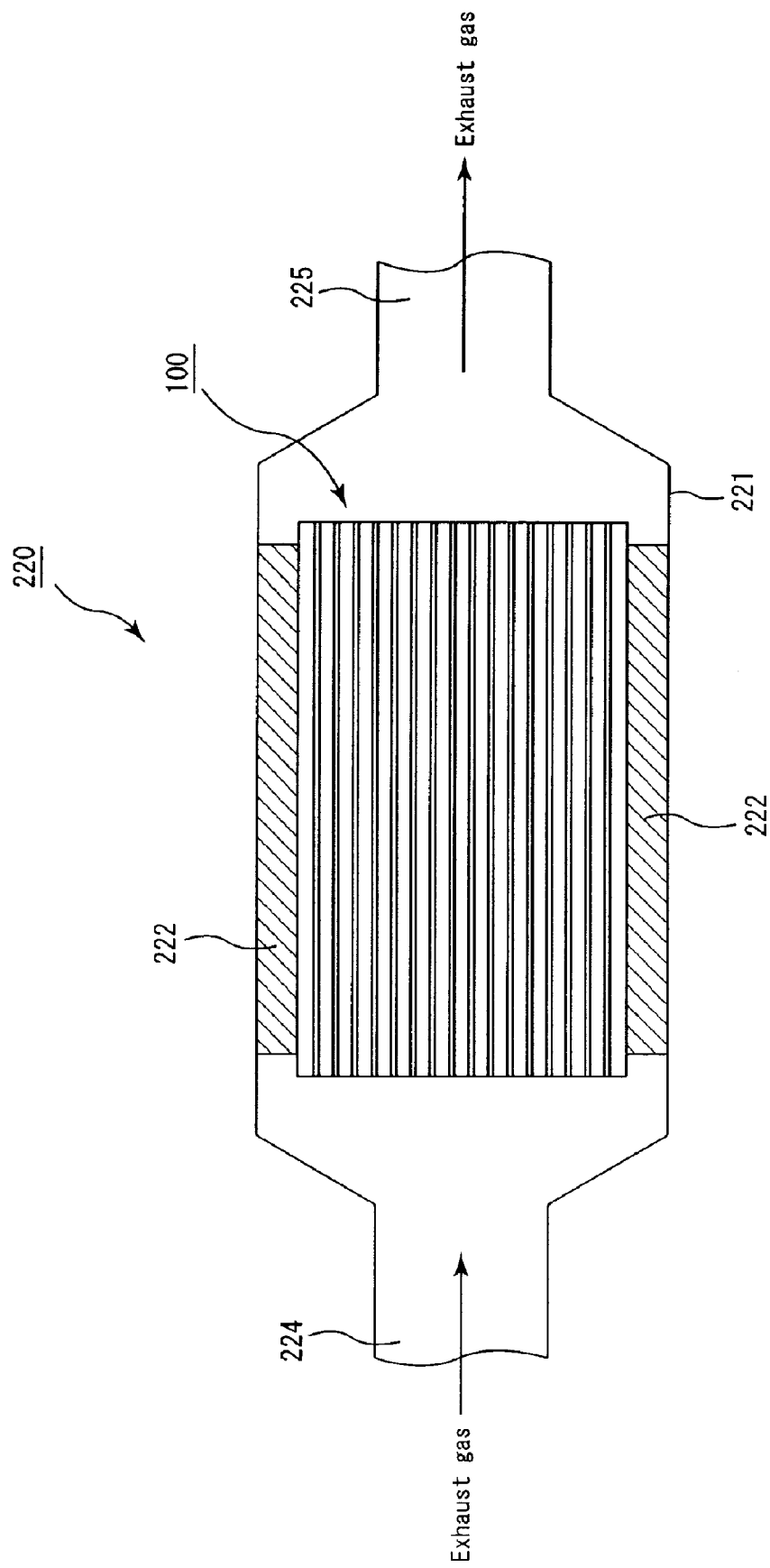
FIG. 6 is a cross-sectional view that shows an exhaust gas purifying apparatus including a honeycomb filter according to an embodiment of the present invention.

As shown in FIG. 6, a honeycomb filter according to the embodiment of the present invention is provided in an exhaust passage of an engine so that an exhaust gas purifying apparatus is manufactured.

An exhaust gas purifying apparatus 220 was mainly configured with a honeycomb filter 100, a casing 221 that covers the outside of the honeycomb filter 100, and a holding sealing material 222 interposed between the honeycomb filter 100 and the casing 221. Further, an introducing pipe 224, which was coupled to an internal combustion engine such as an engine, was connected to the end portion of the casing 221 on the side from which exhaust gases were introduced, and an exhaust pipe 225 coupled to the outside was connected to the other end portion of the casing 221. Here, in FIG. 6, arrows show flows of exhaust gases.

EXAMPLES

The following description will discuss the first embodiment of the present invention in more detail by using examples; however, the present invention is not limited only to these examples.

In the following Examples and Comparative Examples, honeycomb filters having the ratio of the area Y, the ratio of the area Z and the ratio of the area X set to different values were manufactured. Then, with respect to each of the honeycomb filters, exhaust gas conversion performance was evaluated by measuring $CO_2$ selectivity during the regenerating process. Further, presence or absence of the occurrence of a crack during the regenerating process was also evaluated.

Example 1

Manufacturing of Honeycomb Fired Body

An amount of 52.8% by weight of coarse powder of silicon carbide having an average particle diameter of 22 μm and 22.6% by weight of fine powder of silicon carbide having an average particle diameter of 0.5 μm were mixed. To the resulting mixture, 2.1% by weight of acrylic resin, 4.6% by weight of an organic binder (methylcellulose), 2.8% by weight of a lubricant (UNILUB, made by NOF Corporation), 1.3% by weight of glycerin, and 13.8% by weight of water were added, and then kneaded to prepare a mixed composition (wet-mixture). The mixed composition was extrusion-molded and cut, so that a raw honeycomb molded body having virtually the same shape as the shape shown in FIG. 1A and having cells not sealed was manufactured.

Next, the raw honeycomb molded body was dried by using a microwave drying apparatus to obtain a dried body of the honeycomb molded body. A paste having the same composition as the raw molded body was then filled into predetermined cells, and the honeycomb molded body was again dried by using a drying apparatus.

The dried honeycomb molded body was degreased at 400° C., and then fired at 2200° C. under normal pressure argon atmosphere for three hours so that a honeycomb fired body made of a silicon carbide sintered body, with a porosity of 45%, an average pore diameter of 15 μm, a size of 34.3 mm×34.3 mm×150 mm, the number of cells (cell density) of 300 pcs/inch and a thickness of the cell wall of 0.25 mm (10 mil), was manufactured.

Manufacturing of Honeycomb Filter

A large number of honeycomb fired bodies were bonded to one another by using a heat resistant sealing material paste containing 30% by weight of alumina fibers having an average fiber length of 20 μm, 21% by weight of silicon carbide particles having an average particle diameter of 0.6 μm, 15% by weight of silica sol, 5.6% by weight of carboxymethyl cellulose, and 28.4% by weight of water. The bonded honeycomb fired bodies were dried at 120° C., and then cut by using a diamond cutter so that a round pillar-shaped ceramic block having the sealing material layer (adhesive layer) with a thickness of 1.0 mm was manufactured.

Next, a sealing material paste layer having a thickness of 0.2 mm was formed on the peripheral portion of the ceramic block by using the sealing material paste. Further, the sealing material paste layer was dried at 120° C. so that a round pillar-shaped honeycomb filter having a size of 143.8 mm in diameter×150 mm in length, with a sealing material layer (coat layer) formed on the periphery thereof, was manufactured.

Forming of Catalyst Supporting Layer

An alumina slurry was prepared by mixing and stirring γ-alumina particles having an average particle diameter of 0.8 μm with a sufficient amount of water. A honeycomb filter was immersed in the alumina slurry up to the area (area of 75 mm from the end face on the gas inlet side) covering 50% of its overall length, with its end face on the gas inlet side facing down, and maintained in this state for one minute.

Subsequently, the honeycomb filter was once lifted out of the alumina slurry to be turned upside down, and immersed again in the alumina slurry up to the area (area of 15 mm from the end face on the gas outlet side) covering 10% of its overall length, with the face to be the end face on the gas outlet side facing down, and maintained in this state for one minute.

Next, the honeycomb filter was heated at 110° C. for one hour to be dried, and further fired at 700° C. for one hour so that a catalyst supporting layer was formed in the area covering 50% of its overall length from the end face on the gas inlet side and in the area covering 10% from the end face on the gas outlet side of the honeycomb filter.

At this time, the immersing process into the alumina slurry, drying process, and firing process were repeatedly carried out so that the formation amount of the catalyst supporting layer became 40 g per 1 liter of volume of the area with the catalyst supporting layer formed therein in the honeycomb filter.

(Supporting of Platinum Catalyst)

The honeycomb filter was immersed in a solution (platinum solution) of diammine dinitro platinum nitric acid ([Pt$(NH_3)_2(NO_2)_2$]$HNO_3$, platinum concentration of 4.53% by weight) up to an area covering 50% of its overall length, with its end face on the gas inlet side facing down and maintained in this state for one minute.

Subsequently, the honeycomb filter was lifted out of the platinum solution to be turned upside down, and immersed again in the platinum solution up to the area covering 10% of its overall length (area of 15 mm from the end face on the gas outlet side), with the face to be the end face on the gas outlet side facing down, and maintained in this state for one minute.

Next, the honeycomb filter was dried at 110° C. for two hours, and further fired at 500° C. for one hour under a nitrogen atmosphere so that a platinum catalyst was supported on the catalyst supporting layer.

The supported amount of the catalyst was set to be 1 g of platinum with respect to 20 g of the catalyst supporting layer, that is, 1.2 g of the catalyst with respect to 1 liter of the honeycomb filter.

Thus, a honeycomb filter with a catalyst supporting layer including alumina formed in a predetermined area and with the platinum catalyst supported on the catalyst supporting layer was manufactured.

Examples 2 to 11

Round pillar-shaped honeycomb filters were manufactured in the same manner as in Example 1. Then, the honeycomb filters each having the ratio of the area Z, the ratio of the area X and the ratio of the area Y of the values shown in table 1 were manufactured, by changing the area with a catalyst supporting layer formed therein and the area with a catalyst supported thereon.

Here, in the forming process of the catalyst supporting layer, the number of repeating the immersing process into the alumina slurry, drying process and firing process were changed to form catalyst supporting layers.

Further, the platinum catalyst was supported in the same manner as in Example 1.

Comparative Examples 1 to 10

Round pillar-shaped honeycomb filters were manufactured in the same manner as in Example 1. Then, the honeycomb filters each having the ratio of the area Z, the ratio of the area X and the ratio of the area Y of the values shown in table 1 were manufactured, by changing the area with a catalyst supporting layer formed therein and the area with a catalyst supported thereon.

Here, in the forming process of the catalyst supporting layer, the number of repeating the immersing process into the alumina slurry, drying process and firing process were changed to form catalyst supporting layers.

Further, the platinum catalyst was supported in the same manner as in Example 1.

With respect to these honeycomb filters, respective characteristics were evaluated as follows.

Measurements of Thermal Conductivity

With respect to each of the measurement portions $31z$, $31x$ and $31y$, thermal conductivity of the cell walls was measured by laser flash method.

The results show that, in all honeycomb filters, thermal conductivities of the cell walls in the catalyst unsupporting areas were larger than thermal conductivities of the cell walls in the inlet-side catalyst supporting areas and the outlet-side catalyst supporting areas.

Figure 4:
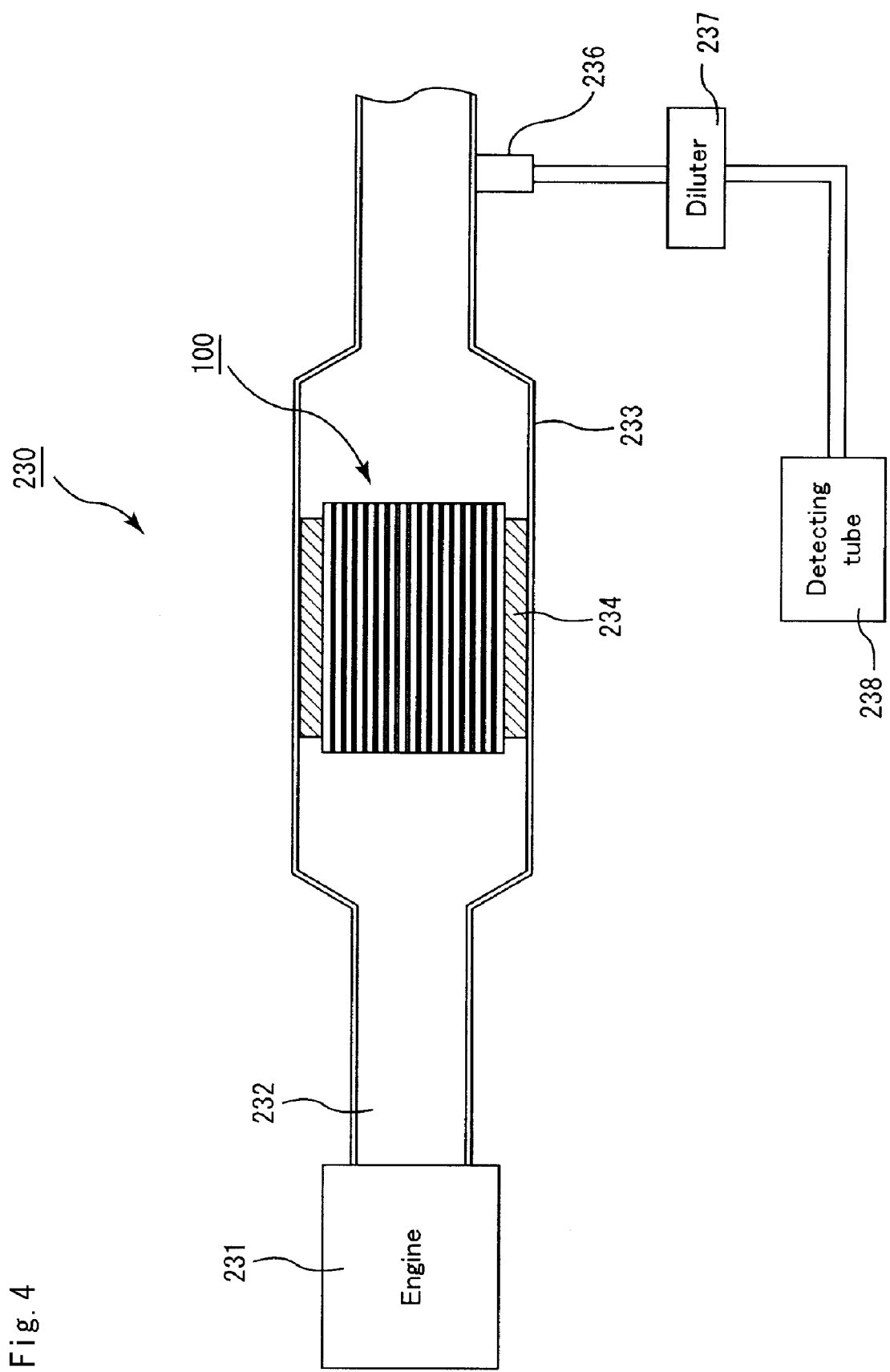
FIG. 4 is an explanatory view of CO2 selectivity measuring apparatus.

Measurement of $CO_2$ Selectivity and Determination of Presence or Absence of Crack $CO_2$ selectivity was measured by using a selectivity measuring apparatus 230 as shown in FIG. 4. FIG. 4 is an explanatory view of the CO2 selectivity measuring apparatus.

The CO2 selectivity measuring apparatus 230 includes a 2 L (litter) common-rail-type diesel engine 231, an exhaust gas pipe 232 that allows exhaust gases from the engine 231 to flow therein, a metal casing 233 connected to the exhaust gas pipe 232 and fixing the honeycomb filter 100 wrapped with an alumina mat 234, a sampler 236 that samples exhaust gases after flowing through the honeycomb filter 100, a diluter 237 for diluting the exhaust gases sampled by the sampler 236, and a detecting tube 238 for measuring concentration of $CO_2$ and CO contained in the diluted exhaust gases.

Next, there is described a measuring procedure. The engine 231 was driven at the number of revolutions of 2000 $min^{-1}$ and a torque of 47 Nm so that exhaust gases from the engine 231 were allowed to pass through the honeycomb filter 100. Then, the engine 231 was driven until 6.0 g of PM with respect to 1 liter of the honeycomb filter was captured. Thereafter, PM was burned by using a post injection method, thereby the regenerating process of the honeycomb filter has been carried out.

Here, CO concentration Dco and $CO_2$ concentration $D_{co2}$ of the exhausted gases sampled by the sampler 236 during the regenerating process were measured by using the detecting tube 238. Then, the $CO_2$ selectivity was calculated by the following calculation formula.

$$CO_2 \text{ selectivity } (\%) = [D_{co2}/(D_{co}+D_{co2})] \times 100$$

A higher $CO_2$ selectivity indicates a less CO in the exhaust gases, that is, CO generated during the regenerating process was well converted. In respective tables, "+" indicates the $CO_2$ selectivity of 75% or more and "−" indicates the $CO_2$ selectivity less than 75%.

Further, with respect to the honeycomb filter after the regenerating process, presence or absence of a crack was visually observed. In respective tables, "+" indicates that no crack was observed and "−" indicates that a crack was observed.

Table 1 and Table 2 show the following: the ratio of the area Z, the ratio of the area X and the ratio of the area Y in the honeycomb filter manufactured in each of Examples and Comparative Examples; The inequality (applicable inequality) which is applied out of the inequalities (1) to (3) defined in the embodiments of the present invention; the maximum value and the minimum value of the ratio of the area Z obtained by substituting the ratio of the area Y in each of Examples and Comparative Examples into the applicable inequality.

With respect to these honeycomb filters, measurement results of the $CO_2$ selectivity and presence or absence of a crack are collectively shown in Table 1 and Table 2.

TABLE 1

|  | Ratio of area Z (%) | Ratio of area X (%) | Ratio of area Y (%) | Applicable inequality | Maximum value of ratio of area Z(%) | Minimum value of ratio of area Z(%) | $CO_2$ Selectivity | Presence of crack |
|---|---|---|---|---|---|---|---|---|
| Example 2 | 90 | 9 | 1 | (2) | 90 | 90 | + | + |
| Example 3 | 80 | 15 | 5 | (2) | 83 | 59 | + | + |
| Example 4 | 70 | 25 | 5 | (2) | 83 | 59 | + | + |
| Example 5 | 60 | 35 | 5 | (2) | 83 | 59 | + | + |
| Example 6 | 75 | 15 | 10 | (2) | 75 | 20 | + | + |
| Example 1 | 50 | 40 | 10 | (2) | 75 | 20 | + | + |
| Example 7 | 20 | 70 | 10 | (2) | 75 | 20 | + | + |
| Example 8 | 35 | 50 | 15 | (3) | 36 | 12 | + | + |
| Example 9 | 25 | 60 | 15 | (3) | 36 | 12 | + | + |
| Example 10 | 12 | 73 | 15 | (3) | 36 | 12 | + | + |
| Example 11 | 5 | 76 | 19 | (3) | 5 | 5 | + | + |

TABLE 2

|  | Ratio of area Z (%) | Ratio of area X (%) | Ratio of area Y (%) | Applicable inequality | Maximum value of ratio of area Z(%) | Minimum value of ratio of area Z(%) | $CO_2$ Selectivity | Presence of crack |
|---|---|---|---|---|---|---|---|---|
| Comparative Example 1 | 95 | 4 | 1 | (2) | 90 | 90 | + | − |
| Comparative Example 2 | 85 | 14 | 1 | (2) | 90 | 90 | − | + |
| Comparative Example 3 | 85 | 10 | 5 | (2) | 83 | 59 | + | − |
| Comparative Example 4 | 55 | 40 | 5 | (2) | 83 | 59 | − | + |
| Comparative Example 5 | 80 | 10 | 10 | (2) | 75 | 20 | + | − |
| Comparative Example 6 | 15 | 75 | 10 | (2) | 75 | 20 | − | + |
| Comparative Example 7 | 40 | 45 | 15 | (3) | 36 | 12 | + | − |
| Comparative Example 8 | 10 | 75 | 15 | (3) | 36 | 12 | − | + |
| Comparative Example 9 | 8 | 73 | 19 | (3) | 5 | 5 | + | − |
| Comparative Example 10 | 3 | 78 | 19 | (3) | 5 | 5 | − | + |

Figure 5:
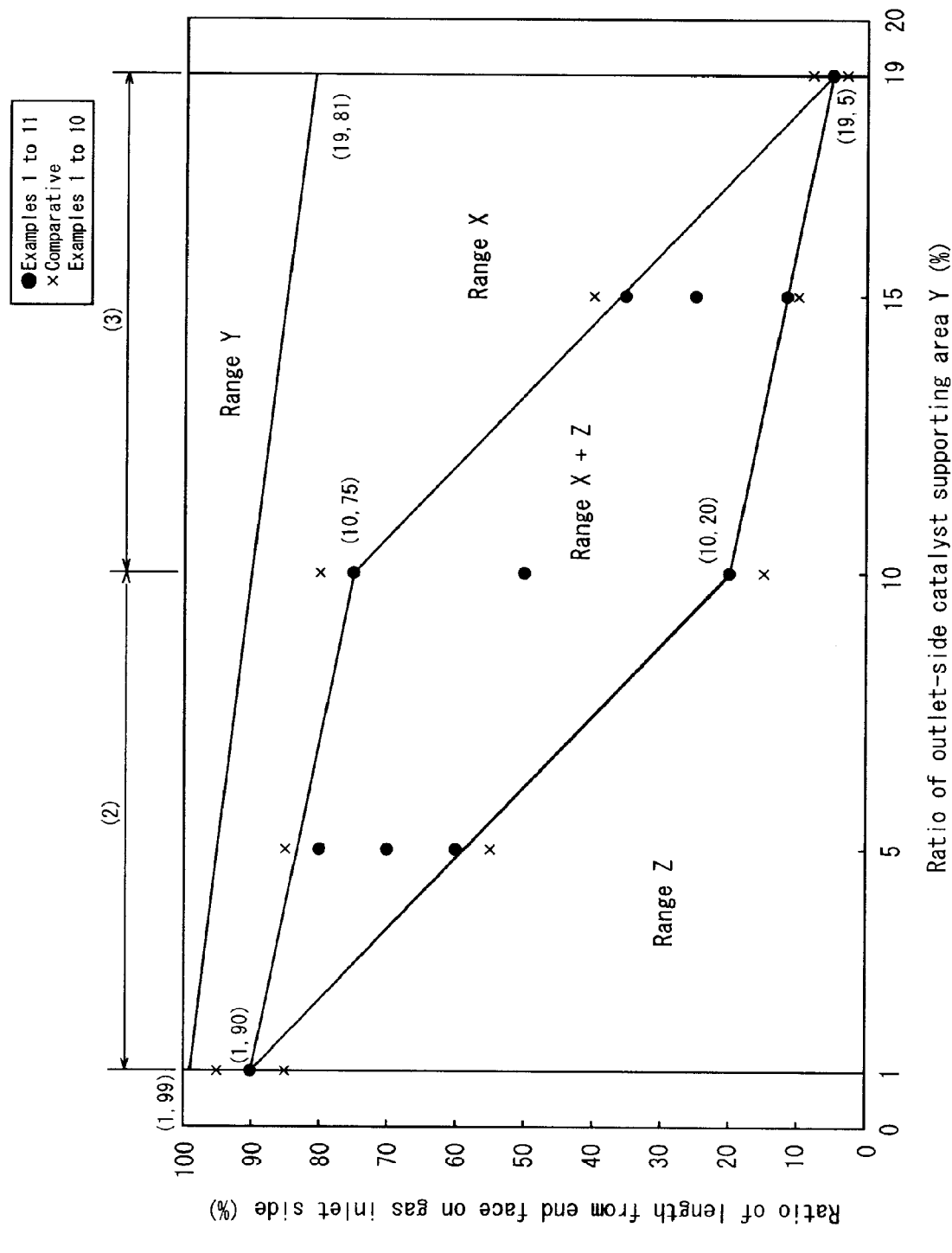
FIG. 5 is a graph in which the value of the ratio of the area Y in each of Examples and Comparative Examples is plotted on a horizontal axis and the value of the ratio of the area Z in each of Examples and Comparative Examples is plotted on a vertical axis.

Further, FIG. 5 is a graph in which the value of the ratio of the area Y in each of Examples and Comparative Examples is plotted on a horizontal axis and the value of the ratio of the area Z in each of Examples and Comparative Examples is plotted on a vertical axis. In this graph, the value of each of Examples are plotted by ● and the value of each of Comparative Examples are plotted by x. Further, lines defining the minimum value and the maximum value of the ratio of the area Z indicated by the inequalities (2) and (3) is shown in the same manner as in FIG. 3.

FIG. 5 shows that the plotted points with respect to respective Examples are on any of the lines defining the minimum value and the maximum value of the ratio of the area Z or in a square formed by the respective lines. Namely, the points respectively satisfy either the inequalities (2) or (3).

On the other hand, the plotted points with respect to respective Comparative Examples are positioned out of the square. Namely, the points do not satisfy the inequalities (2) nor (3).

Table 1 shows that the $CO_2$ selectivity in each of Examples is high and CO is sufficiently converted. Further, Table 1 also shows that a crack is not caused during the regenerating process.

Table 2 shows that the $CO_2$ selectivity in Comparative Examples is low in a case where the ratio of the area Z is less than the minimum value defined by the inequality (2) or (3), and CO was not sufficiently converted. Further, Table 2 shows that in a case where the ratio of the area Z exceeds the maximum value defined by the inequality (2) or (3), a crack is caused in the honeycomb filter.

Second Embodiment

The honeycomb filter of the first embodiment has a structure in which a plurality of honeycomb fired bodies are combined with one another by interposing a sealing material layer (adhesive layer) between them; however, the honeycomb filter may be formed by a single honeycomb fired body.

In the present description, the former honeycomb filter is referred to as an aggregated honeycomb filter, and the latter honeycomb filter is referred to as an integral honeycomb filter.

Upon manufacturing an integral honeycomb filter of this kind, a honeycomb molded body is formed by using the same method as the method for manufacturing the aggregated honeycomb filter, except that the size of a honeycomb molded body to be molded through the extrusion-molding process is larger than in a case where the aggregated honeycomb filter is manufactured. Thereafter, the integral honeycomb filter can be manufactured by using the same method as the method for manufacturing the aggregated honeycomb filter of the first embodiment.

Further, with respect to a main constituent material of the integral honeycomb filter, cordierite and aluminum titanate, which are superior in thermal impact resistance, are desirably used, and also in the present embodiment, the effects (1) to (3) of the first embodiment can be exerted.

Other Embodiments

With respect to the shape of the honeycomb filter according to the embodiments of the present invention, it is not particularly limited to the round pillar shape shown in FIG. 2, and the honeycomb filter may have any desired pillar shape such as a cylindroid shape, a rectangular pillar shape.

The porosity of the honeycomb filter according to the embodiments of the present invention is desirably at least about 30% and at most about 70%.

This structure may make it easier to maintain sufficient strength in the honeycomb filter and to maintain a low level resistance at the time of passage of exhaust gases through the cell walls.

In contrast, the porosity of less than about 30% tends to cause clogging in the cell walls in an early stage, while the porosity of more than about 70% tends to cause a decrease in strength of the honeycomb filter with the result that the honeycomb filter might be easily broken.

Here, the porosity can be measured through conventionally known methods such as a mercury injection method, Archimedes method, a measuring method using a scanning electronic microscope (SEM).

The cell density on a cross section perpendicular to the longitudinal direction of the honeycomb filter is not particularly limited. However, a desirable lower limit is about 31.0 pcs/cm2 (about 200 pcs/in2) and a desirable upper limit is about 93 pcs/cm2 (about 600 pcs/in2). A more desirable lower limit is about 38.8 pcs/cm2 (about 250 pcs/in2) and a more desirable upper limit is about 77.5 pcs/cm2 (about 500 pcs/in2).

Further, a thickness of the cell walls of the honeycomb filter is not particularly limited; however, the thickness thereof is desirably at least about 0.1 mm and at most about 0.4 mm.

The main component of constituent materials of the honeycomb filter is not limited to silicon carbide. Examples of other ceramic materials may include a nitride ceramic such as aluminum nitride, silicon nitride, boron nitride and titanium nitride; a carbide ceramic such as zirconium carbide, titanium carbide, tantalum carbide and tungsten carbide; a complex of a metal and a nitride ceramic; a complex of a metal and a carbide ceramic, and the like.

Moreover, a silicon-containing ceramic manufactured by blending a metal silicon into the above-mentioned ceramic and a ceramic material such as ceramic bonded by a silicon or a silicate compound may also be used as the constituent materials of the honeycomb filter.

In the aggregated honeycomb filter as shown in the first embodiment, silicon carbide, which is superior in heat resistant property, mechanical strength thermal conductivity and the like, is particularly desirable as the main component of the constituent materials of the honeycomb filter.

Further, a material manufactured by blending a metal silicon into silicon carbide (silicon-containing silicon carbide) is also preferable.

Although the particle diameter of silicon carbide powder in the wet mixture is not particularly limited, the silicon carbide powder that tends not to cause the case where the size of the honeycomb fired body manufactured by the following firing treatment becomes smaller than that of the honeycomb molded body after degreased is desirable. For example, silicon carbide powder prepared by combining 100 parts by weight of powder having an average particle diameter of at least about 1.0 µm and at most about 50 µm with at least about 5 parts by weight and at most about 65 parts by weight of powder having an average particle diameter of at least about 0.1 µm and at most about 1.0 µm, is preferably used.

The organic binder in the wet mixture is not particularly limited, and examples thereof include carboxymethyl cellulose, hydroxyethyl cellulose, polyethylene glycol, and the like. Out of these, methylcellulose is more desirably used. In general, the blending amount of the organic binder is desirably at least about 1 part by weight and at most about 10 parts by weight with respect to 100 parts by weight of the ceramic powder.

A plasticizer and a lubricant to be used upon preparing the wet mixture are not particularly limited, and for example, glycerin or the like may be used as the plasticizer. Moreover, as the lubricant, for example, polyoxy alkylene-based compounds, such as polyoxyethylene alkyl ether and polyoxypropylene alkyl ether, or the like may be used.

Specific examples of the lubricant include, for example, polyoxyethylene monobutyl ether, polyoxypropylene monobutyl ether, and the like.

Here, the plasticizer and the lubricant are not necessarily contained in the wet mixture depending on cases.

Upon preparing the wet mixture, a dispersant solution may be used, and examples thereof include water, an organic solvent such as benzene, alcohol such as methanol and the like.

Moreover, a molding auxiliary may be added to the wet mixture.

The molding auxiliary is not particularly limited, and examples thereof include ethylene glycol, dextrin, fatty acid, fatty acid soap, polyalcohol, and the like.

Furthermore, a pore-forming agent, such as balloons that are fine hollow spheres including an oxide-based ceramic, spherical acrylic particles, and graphite may be added to the wet mixture, if necessary.

With respect to the balloons, not particularly limited, for example, alumina balloons, glass micro-balloons, shirasu balloons, fly ash balloons (FA balloons), mullite balloons and the like may be used. Out of these, alumina balloons are more desirably used.

Moreover, the content of organic components in the wet mixture is desirably about 10% by weight or less, and the content of moisture is desirably at least about 8% by weight and at most about 30% by weight.

Although a plug material paste used for sealing cells is not particularly limited, the plug material paste that allows the plugs formed through post processes to have a porosity of at least about 30% and at most about 75% is desirably used. For example, the same material as that of the wet mixture may be used.

Examples of the inorganic binder in the sealing material paste include silica sol, alumina sol and the like. Each of these may be used alone or two or more kinds of these may be used in combination. Silica sol is more desirably used among the inorganic binders.

Examples of the organic binder in the sealing material paste include polyvinyl alcohol, methyl cellulose, ethyl cellulose, carboxymethyl cellulose and the like. Each of these may be used alone or two or more kinds of these may be used in combination. Carboxymethyl cellulose is more desirably used among the organic binders.

Examples of the inorganic fibers in the sealing material paste include ceramic fibers, such as silica-alumina, mullite, alumina, silica and the like. Each of these may be used alone or two or more kinds of these may be used in combination. Alumina fibers are more desirably used among the inorganic fibers.

Examples of the inorganic particles in the sealing material paste include carbides, nitrides, and the like, and specific examples thereof include inorganic powder including silicon carbide, silicon nitride, boron nitride and the like. Each of these may be used alone, or two or more kinds of these may be used in combination. Out of the inorganic particles, silicon carbide is desirably used due to its superior thermal conductivity.

Furthermore, a pore-forming agent, such as balloons that are fine hollow spheres including an oxide-based ceramic, spherical acrylic particles and graphite may be added to the sealing material paste, if necessary. The balloons are not particularly limited, and for example, alumina balloons, glass micro-balloons, shirasu balloons, fly ash balloons (FA balloons), mullite balloons, and the like may be used. Out of these, alumina balloons are more desirably used.

With respect to the material forming the catalyst supporting layer, the material having a high specific surface area and capable of highly dispersing the catalyst to support the catalyst thereon is desirably used, and examples thereof include an oxide ceramic such as alumina, titania, zirconia and silica.

Each of these materials may be used alone, or two or more kinds of these may be used in combination.

Out of these, the materials having a high specific surface area of about 250 m2/g or more is desirably selected, and γ-alumina is particularly desirable.

Further, the method for forming the catalyst supporting layer including above-mentioned alumina is not particularly limited to the method explained in the first embodiment. For example, a method may be used in which a honeycomb filter is immersed in a metal compound solution containing aluminum such as an aqueous solution of aluminum nitrate so that the cell walls are coated with an alumina film through a sol-gel method, and the resulting honeycomb filter is dried and fired.

Obviously, numerous modifications and variations of the present invention are possible in light of the above teachings. It is therefore to be understood that within the scope of the appended claims, the invention may be practiced otherwise than as specifically described herein.

The invention claimed is:

1. A honeycomb filter comprising a pillar-shaped honeycomb fired body having a large number of cells longitudinally disposed in parallel with one another with a cell wall therebetween, with either one end of each of said cells sealed, said honeycomb filter allowing gases having flowed in through either one end face side to flow out from the other end face side, said honeycomb filter including:

an outlet-side catalyst supporting area with a catalyst supporting layer formed from an end face on a gas outlet side of said honeycomb filter toward an end face on a gas inlet side of said honeycomb filter, said catalyst supporting layer having a catalyst supported thereon;

an inlet-side catalyst supporting area with a catalyst supporting layer formed from an end face on the gas inlet side of said honeycomb filter toward an end face on the gas outlet side of said honeycomb filter, said catalyst supporting layer having a catalyst supported thereon; and a catalyst unsupporting area with substantially no catalyst supporting layer formed between said outlet-side catalyst supporting area and said inlet-side catalyst supporting area, said catalyst unsupporting area having substantially no catalyst supported thereon, wherein a thermal conductivity of said catalyst unsupporting area is larger than thermal conductivities of said outlet-side catalyst supporting area and said inlet-side catalyst supporting area, and wherein Y (%), Z (%), and X (%) satisfy the following inequalities (1) to (4):

$$\text{about } 1 \leq Y \leq \text{about } 19 \tag{1}$$

$$(880-70Y)/9 \leq Z \leq (825-15Y)/9 \,(\text{about } 1 \leq Y \leq \text{about } 10) \tag{2}$$

$$(330-15Y)/9 \leq Z \leq (1375-70Y)/9 \,(\text{about } 10 \leq Y \leq \text{about } 19) \tag{3}$$

$$X = 100 - Y - Z \tag{4},$$

Y (%) indicating a ratio of a length of said outlet-side catalyst supporting area in a longitudinal direction of said honeycomb filter to an entire length of said honeycomb filter in the longitudinal direction, Z (%) indicating a ratio of a length of said inlet-side catalyst supporting area in the longitudinal direction of said honeycomb filter to the entire length of said honeycomb filter in the longitudinal direction, X (%) indicating a ratio of a length of said catalyst unsupporting area in the longitudinal direction of said honeycomb filter to the entire length of said honeycomb filter in the longitudinal direction.

2. The honeycomb filter according to claim 1, wherein said catalyst comprises a noble metal, an alkali metal, or an alkali-earth metal.

3. The honeycomb filter according to claim 2, wherein said catalyst comprises platinum.

4. The honeycomb filter according to claim 1, wherein said catalyst is supported in an amount of at least about 0.5 g and at most about 5.0 g with respect to a volume of 1 liter of the honeycomb filter.

5. The honeycomb filter according to claim 1, wherein a material forming said catalyst supporting layer comprises an oxide ceramic.

6. The honeycomb filter according to claim 5, wherein said oxide ceramic comprises alumina, titania, zirconia, or silica.

7. The honeycomb filter according to claim 1, wherein a main component of said honeycomb filter comprises silicon carbide.

8. The honeycomb filter according to claim 1, wherein a main component of said honeycomb filter comprises silicon carbide containing silicon.

9. The honeycomb filter according to claim 1, wherein a main component of said honeycomb filter comprises one of cordierite and aluminum titanate.

10. The honeycomb filter according to claim 1, wherein the thermal conductivity of said catalyst unsupporting area is at least about 1.3 times and at most about 5.0 times larger than the thermal conductivity of said outlet-side catalyst supporting area and said inlet-side catalyst supporting area.

11. The honeycomb filter according to claim 1, wherein said honeycomb filter is formed of a plurality of said honeycomb fired bodies which are combined with one another by interposing an adhesive layer.

12. The honeycomb filter according to claim 1, wherein said honeycomb filter is formed of a single honeycomb fired body.

13. The apparatus according to claim 1, wherein said honeycomb filter is formed of a single honeycomb fired body.

14. An exhaust gas purifying apparatus, said apparatus comprising:
a honeycomb filter;
a casing covering an outside of said honeycomb filter; and
a holding sealing material interposed between said honeycomb filter and said casing,
wherein said honeycomb filter comprises a pillar-shaped honeycomb fired body having a large number of cells longitudinally disposed in parallel with one another with a cell wall therebetween, with either one end of each of said cells sealed,
said honeycomb filter allowing gases having flowed in through either one end face side to flow out from the other end face side,
said honeycomb filter including:
an outlet-side catalyst supporting area with a catalyst supporting layer formed from an end face on a gas outlet side of said honeycomb filter toward an end face on a gas inlet side of said honeycomb filter, said catalyst supporting layer having a catalyst supported thereon;
an inlet-side catalyst supporting area with a catalyst supporting layer formed from an end face on the gas inlet side of said honeycomb filter toward an end face on the gas outlet side of said honeycomb filter, said catalyst supporting layer having a catalyst supported thereon; and
a catalyst unsupporting area with substantially no catalyst supporting layer formed between said outlet-side catalyst supporting area and said inlet-side catalyst supporting area, said catalyst unsupporting area having substantially no catalyst supported thereon,
wherein a thermal conductivity of said catalyst unsupporting area is larger than thermal conductivities of said outlet-side catalyst supporting area and said inlet-side catalyst supporting area, and
wherein Y (%), Z (%), and X (%) satisfy the following inequalities (1) to (4):

$$\text{about } 1 \leq Y \leq \text{about } 19 \quad (1)$$

$$(880-70Y)/9 \leq Z \leq (825-15Y)/9 \text{(about } 1 \leq Y \leq \text{about } 10) \quad (2)$$

$$(330-15Y)/9 \leq Z \leq (1375-70Y)/9 \text{(about } 10 \leq Y \leq \text{about } 19) \quad (3)$$

$$X=100-Y-Z \quad (4),$$

Y (%) indicating a ratio of a length of said outlet-side catalyst supporting area in a longitudinal direction of said honeycomb filter to an entire length of said honeycomb filter in the longitudinal direction,
Z (%) indicating a ratio of a length of said inlet-side catalyst supporting area in the longitudinal direction of said honeycomb filter to the entire length of said honeycomb filter in the longitudinal direction,
X (%) indicating a ratio of a length of said catalyst unsupporting area in the longitudinal direction of said honeycomb filter to the entire length of said honeycomb filter in the longitudinal direction.

15. The apparatus according to claim 14, wherein said catalyst comprises a noble metal, an alkali metal, or an alkali-earth metal.

16. The apparatus according to claim 14, wherein said catalyst comprises platinum.

17. The apparatus according to claim 14, wherein said catalyst is supported in an amount of at least about 0.5 g and at most about 5.0 g with respect to a volume of 1 liter of the honeycomb filter.

18. The apparatus according to claim 14, wherein a material forming said catalyst supporting layer comprises an oxide ceramic.

19. The apparatus according to claim 18, wherein said oxide ceramic comprises alumina, titania, zirconia, or silica.

20. The apparatus according to claim 14, wherein a main component of said honeycomb filter comprises silicon carbide.

21. The apparatus according to claim 14, wherein a main component of said honeycomb filter comprises silicon carbide containing silicon.

22. The apparatus according to claim 14, wherein a main component of said honeycomb filter comprises one of cordierite and aluminum titanate.

23. The apparatus according to claim 14, wherein the thermal conductivity of said catalyst unsupporting area is at least about 1.3 times and at most about 5.0 times larger than the thermal conductivity of said outlet-side catalyst supporting area and said inlet-side catalyst supporting area.

24. The apparatus according to claim 14, wherein said honeycomb filter is formed of a plurality of said honeycomb fired bodies which are combined with one another by interposing an adhesive layer.

* * * * *